United States Patent [19]

Kawamura et al.

[11] Patent Number: 4,926,102
[45] Date of Patent: May 15, 1990

[54] INVOLUTE INTERPOLATION METHOD

[75] Inventors: Hideaki Kawamura, Hachioji; Kentaro Fujibayashi, Musashino; Toshiaki Otsuki, Hino, all of Japan

[73] Assignee: Fanuc Ltd., Minamitsuru, Japan

[21] Appl. No.: 309,664

[22] PCT Filed: Jun. 14, 1988

[86] PCT No.: PCT/JP88/00581
§ 371 Date: Feb. 6, 1989
§ 102(e) Date: Feb. 6, 1989

[87] PCT Pub. No.: WO88/10456
PCT Pub. Date: Dec. 29, 1988

[30] Foreign Application Priority Data

Jun. 24, 1987 [JP] Japan ............... 62-157303

[51] Int. Cl.⁵ ............................ G05B 19/25
[52] U.S. Cl. ........................ 318/573; 51/287; 51/123 G; 409/9; 409/131
[58] Field of Search ............ 318/573; 51/287, 123 G; 409/9, 131

[56] References Cited

U.S. PATENT DOCUMENTS

| | | | |
|---|---|---|---|
| Re. 28,559 | 9/1975 | Villano | 409/131 |
| Re. 28,766 | 4/1976 | Villano | 318/573 |
| 3,906,677 | 9/1975 | Gunter et al. | 51/123 G |
| 3,986,305 | 10/1976 | Gunter | 51/287 |
| 4,548,531 | 10/1985 | Seitelman | 409/9 |
| 4,606,153 | 8/1986 | Bloch et al. | 51/287 |

Primary Examiner—William M. Shoop, Jr.
Assistant Examiner—Saul M. Bergmann
Attorney, Agent, or Firm—Staas & Halsey

[57] ABSTRACT

An involute interpolation method for machining operations is used in a numerical control apparatus.

A rotational direction (G03.1) of an involute curve, an incremental distance along the involute curve or an incremental angle, a center position ($X_0$, $Y_0$) of a base circle and a radius (R) of the base circle are obtained per the instruction. The involute curve is interpolated using a predetermined distance or predetermined angle.

The above processing is executed with a numerical control apparatus and pulse distributions are continuously carried out. Therefore, the involute curve can be interpolated without need for a special program producing system.

6 Claims, 5 Drawing Sheets

INVOLUTE INTERPOLATION METHOD

BACKGROUND OF THE INVENTION

1. Field of the Invention

The present invention relates to an involute interpolation method for machining operations in a numerical control apparatus or the like, and more particularly to an involute interpolation method in which an involute curve can readily be interpolated in the numerical control apparatus.

2. Description of the Related Art

In curve interpolation with a numerical control apparatus, interpolation of an involute curve has particularly been needed for machining gears, vanes of pumps and the like, and it has been a general practice to interpolate the involute curve with a computer or an NC program producing system which are distinctly provided from the numerical control apparatus to analyze curve data into straight line data, whereupon numerical control machinings are performed with the use of a tape.

Accordingly, an instruction tape producing system has additionally been required other than the numerical control apparatus. In addition, the tape is extremely long because it contains minutely analyzed lines, so that the management of the tape is intricate. Furthermore, there has been a problem such that pulse distribution is interrupted during a high-speed driving, and thus a smooth cutting operation is not ensured.

DISCLOSURE OF THE INVENTION

An object of this invention is to resolve the above problem and to provide an involute interpolation method in which an involute curve can readily be interpolated in the numerical control apparatus.

In order to resolve the above-noted problem, the invention provides an involute interpolation method for machining operations in a numerical control apparatus comprising the steps of:

instructing a rotational direction of an involute curve, a moving distance of the involute curve or a moving angle thereof, a center position of a base circle and a radius (R) of the base circle; and interpolating the involute curve at every predetermined distance or every predetermined angle.

The rotational direction, the moving distance or moving angle, the center position of the base circle and the radius of the base circle are initially instructed to specify the involute curve.

From the given instructions, equations for the curve are determined and based upon such equations pulse interpolation is carried out at every predetermined moving distance or every predetermined angle.

The processing above is implemented with a numerical control apparatus so that pulse distribution is continuously carried out.

DESCRIPTION OF THE PREFERRED EMBODIMENT

Figure 1A:
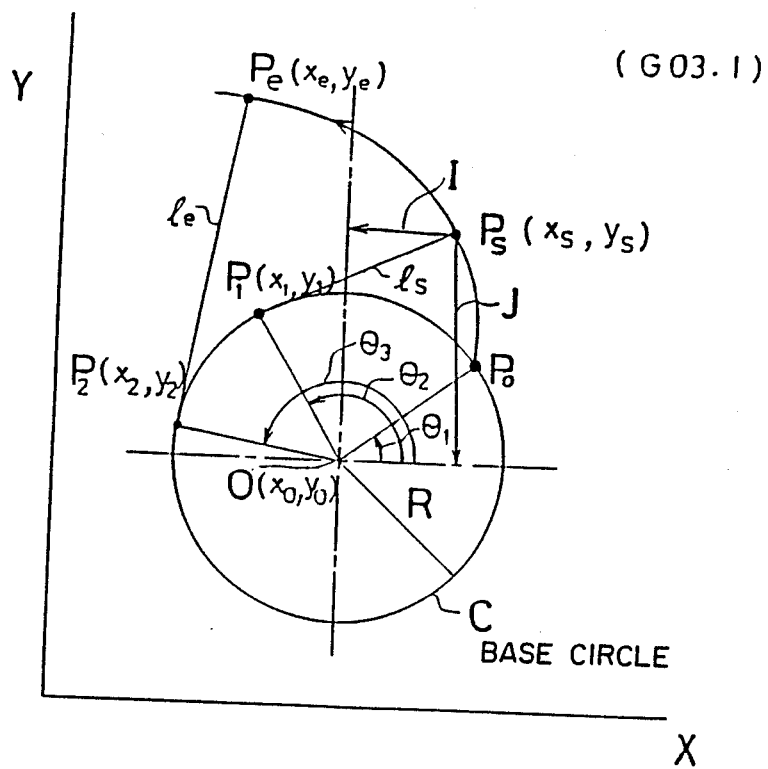
FIG. 1(a) is a diagram showing an involute curve rotating in the counterclockwise direction leaving from a base circle.
Figure 1B:
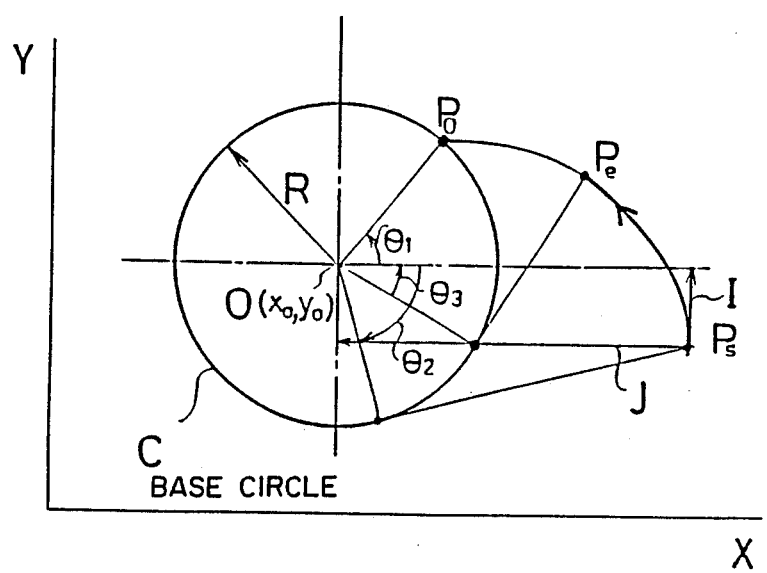
FIG. 1(b) is a diagram showing an involute curve rotating in the counterclockwise direction approaching a base circle.
Figure 1:
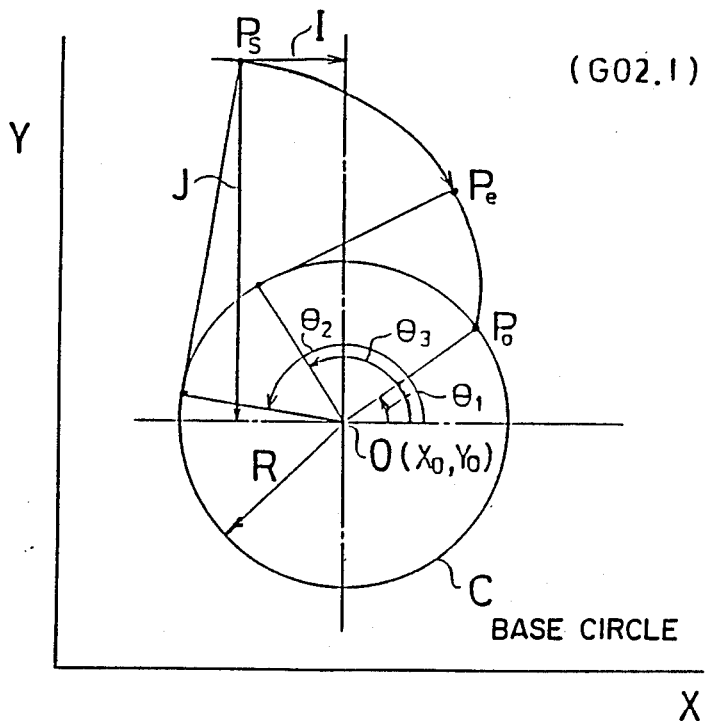
FIG. 1(c) is a diagram showing an involute curve rotating in the clockwise direction approaching a base circle.
FIG. 1(d) is a diagram showing an involute curve rotating in the clockwise direction leaving from a base circle.
Figure 1:
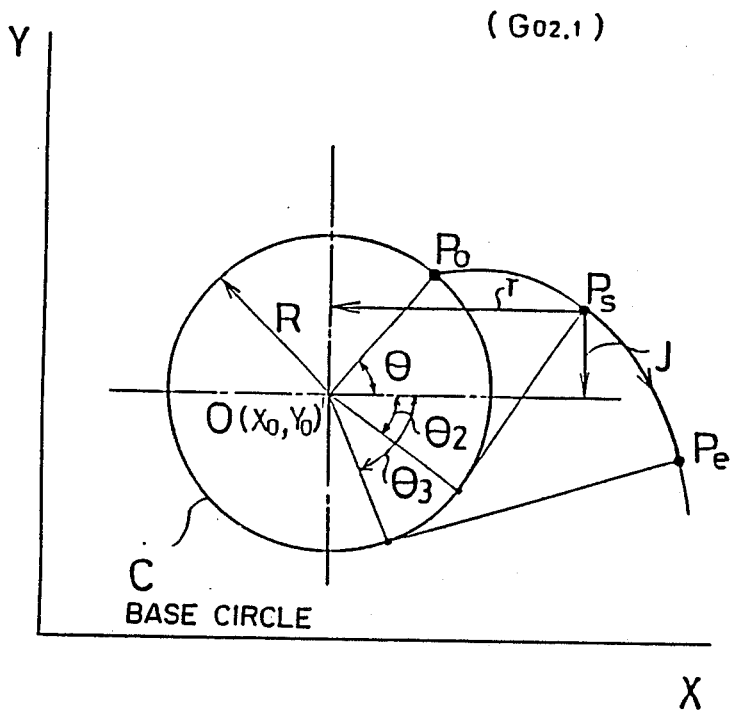

One embodiment of the present invention will be described with reference to the accompanying drawings. Involute curves are exemplified in FIGS. 1(a) through 1(d). FIG. 1(a) shows the involute curve rotating in the counterclockwise direction leaving from a base circle, in response to the instruction G03.1. FIG. 1(b) shows another involute curve rotating in the counterclockwise direction approaching the base circle, in response to the instruction G03.1. FIG. 1(c) shows still another involute curve rotating in the clockwise direction approaching the base circle, in response to the instruction G02.1. FIG. 1(d) shows yet another involute curve rotating in clockwise direction leaving from the base circle, in response to the instruction G02.1.

Although there are four types of involute curves as above, they are the same in principle. Accordingly, the following description will be made with reference to the curve illustrated in FIG. 1(a). In FIG. (2), the involute curve is depicted with reference to a base circle C having a center, represented by 0 at coordinates, by O ($X_0$, $Y_0$) and a radius R. The involute curve starts with a point $P_0$ and an angle $\theta 1$ formed by a line connecting the point $P_0$ and the center O, and the axis X.

A point Ps (Xs, Ys) is the start point for interpolation. A tangential line ls is drawn from this point Ps to the base circle C and a point of contact of this tangential line ls with the base circle C is represented by P1 (X1, Y1). An angle $\theta_2$ is defined by the X axis and a line connecting the point P1 and the center O of the base circle.

A point Pe (Xe, Ye) is the end point for interpolation. From this point, a tangential line le is drawn to the base circle C and the point of contact of this tangential line le with the base circle C is represented by P2 (X2, Y2). An angle $\theta_3$ is defined by the X axis and a line connecting the point P2 and the center O of the base circle.

An instruction for the involute interpolation is given by G17G03.1X—Y—I—J—R—F—;. The instruction G17 specifies the X-Y plane, G18 specifies the Z-X plane and G19 specifies the a Y-Z plane. G03.1 is an instruction of interpolation for an involute curve rotating in the counterclockwise direction. Interpolation for an involute curve rotating in the clockwise direction is given by G02.1. Whether the curve approaches the base circle or it leaves from the base circle is determined depending upon the coordinate values of the start and end points of the involute curve.

X-Y represents coordinates of the end point of the involute curve, which in FIG. 1(a), corresponds to Pe (Xe, Ye). The instruction uses absolute values ($P_e$ is in the first quadrant).

I-J represents the coordinates of the center of the base circle C as viewed from the start point Ps (Xs, Ys). Thus, incremental values along the X and Y axes used.

R is the radius of the base circle C and F is the feeding speed. The ";" end-of-block.

Next, values for defining the involute curve are obtained based upon the above instructions.

(1) Center Coordinate 0 of Base Circle

The coordinates of the start point Ps (Xs, Ys) of the involute curve are not contained in the instructions. However, such have been stored in the interior of the numerical control apparatus as a current position. Based upon a distance (I, J) from the start point Ps (Xs, Ys) to the center of the base circle of the involute curve as viewed from the start point, the center coordinates O (X0, Y0) of the base circle are obtained from the following equations.

$$X_0 = X_s + I$$

$$Y_0 = Y_s + J$$

(2) Angle $\theta 2$ at Start Point on Involute Curve

A tangential line ls is drawn to the base circle C from the start point Ps and the point of contact of this tangential line ls with the base circle C is represented by P1 (X1, Y1). Upon connecting the point P1 and the center O of the base circle C with a straight line, an angle that this line intersects the X axis is obtained. The angle thus obtained represents the angle $\theta 2$ of the start point on the involute curve.

(3) Angle $\theta 3$ at End Point on Involute Curve

A tangential line le is drawn to the base circle C from the end point Pe (Xe, Ye) on the involute curve and the point of contact of this tangential line with the base circle C is represented by P2 (X2, Y2). Upon connecting the point P2 and the center of the base circle C with a straight line, the angle between this line and the X axis is the angle $\theta 3$ of the end point on the involute curve.

(4) Curve Start Point Angle $\theta 1$ of Involute Curve

The distance between the point P1 and the point P0 is equal to the length of the line segment ls according to the definition of the involute curve. Accordingly, representing the length of the line segment ls with L, $$\theta 1 = \theta 2 - L/R \text{ (unit: radian)}$$

the curve start point angle $\theta 1$ of the involute curve can be obtained from the above equation.

(5) From the foregoing values, coordinates of an arbitrary point on the involute curve are given by the following equations.

$$X = R\{\cos(\theta + \theta 1) + \theta \sin(\theta + \theta 1)\} + X_0$$

$$Y = R\{\sin(\theta + \theta 1) - \theta \cos(\theta + \theta 1)\} + Y_0$$

The angle $\theta$ is incremented by a predetermined value from $\theta = (\theta 2 - \theta 1)$ to $\theta = (\theta 3 - \theta 1)$ to sequentially obtain the points on the involute curve, whereupon the distances between two adjacent points may be obtained and straight line interpolation may be performed with respect thereto. The involute curve can thus be interpolated.

From the above equation, three consecutively plotted points may be obtained while incrementing the angle $\theta$ by the predetermined value so that the involute curve may be interpolated with a segment.

Although the above description has been made with respect to an interpolation method based upon specific instructions, interpolation can be performed if instructions relating to the rotational direction of the involute curve, the distance between points on the curve, the radius of the base circle and its center coordinates are given, and the equations for interpolation may be modified in various way depending upon the format of the instructions. Furthermore, the distance between points on the curve can be defined by an incremental angle as viewed from the center of the base circle.

Figure 2:
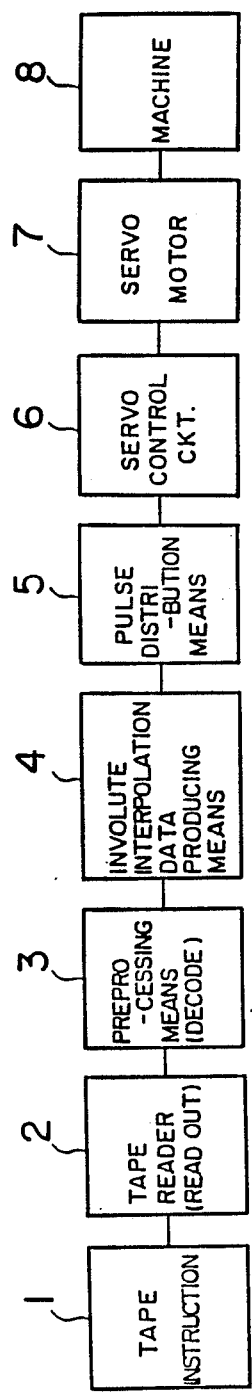
FIG. 2 is a block diagram of a numerical control apparatus according to one embodiment of the present invention.

Next, description will be made with reference to a numerical control apparatus for carrying out the of the involute curve. FIG. 2 is a diagram of a numerical control apparatus according to this embodiment. A tape instruction 1 is a punched tape containing the aforementioned instructions, and a tape reader 2 reads the tape 1. A preprocessing unit 3 discriminates an involute interpolation instruction from the G codes. An involute interpolation data producing unit 4 produces data needed for involute interpolation from the instructions. Designated by reference numeral 5 is a pulse distribution unit. From the data produced by the involute interpolation data producing unit 4, an angle $\theta$ is incremented by a predetermined value to obtain a sequence of points on the involute curve, whereupon line interpolation or segmental interpolation and pulse distribution are carried out. A servo control circuit 6 drives a servo motor in accordance with each instruction. The servo motor 7 moves a machine 8 through a ball screw, etc.

As described, according to the present invention, data for the interpolation of the involute curve is computed in the numerical control apparatus, and based upon the data thus computed the involute curve is interpolated with a straight line or the like. Accordingly, while dispensing with a specific program producing system or the like, the interpolation of the involute curve can be accomplished.

What is claimed is:

1. An involute interpolation method for machining operations in a numerical control apparatus, comprising the steps of:
   (a) obtaining, from a numerical control instruction, a rotational direction of an involute curve, one of an incremental distance along the involute curve and an incremental angle, a center position of a base circle of the involute curve and a radius of the base circle; and
   (b) interpolating the involute curve using one of a predetermined distance and a predetermined angle.

2. An involute interpolation method according to claim 1, wherein said obtaining in step (a) includes obtaining the rotational direction of the involute curve, coordinates of an end point, coordinates of the center position of the base circle as viewed from a start point, and the radius (R) of the base circle; and wherein said interpolating in step (b) uses the coordinates of the center position of the base circle of the involute curve represented by ($X_0$, $X_0$), an angle of the start point represented by $\theta 2$, an angle of the end point represented by $\theta 3$, a curve start angle represented by ($\theta 1$) and coordinates of the start point to interpolate the involute curve represented by $$X = R\{\cos(\theta + \theta 1) + \theta \sin(\theta + \theta 1)\} + X_0$$

$$Y = R\{\sin(\theta + \theta 1) - \theta \cos(\theta + \theta 1)\} + Y_0,$$

where $\theta$ is incremented in a range from $\theta = (\theta 2 - \theta 1)$ to $\theta = (\theta 3 - \theta 1)$ by the predetermined angle to obtain corresponding points on the involute curve.

3. An involute interpolation method according to claim 1, wherein a point-to-point interval on the involute curve is interpolated using a straight line.

4. An involute interpolation method according to claim 1, wherein a point-to-point interval of the involute curve is interpolated using segmental interpolation.

5. An involute interpolation method according to claim 1, further comprising the step of obtaining a rotational speed of the involute curve from the numerical control instruction.

6. An involute interpolation method according to claim 1, further comprising the step of obtaining a designation of a plane from the numerical control instruction.

* * * * *

UNITED STATES PATENT AND TRADEMARK OFFICE
CERTIFICATE OF CORRECTION

PATENT NO. : 4,926,102

DATED : May 15, 1990

INVENTOR(S) : Kawamura et al.

It is certified that error appears in the above-identified patent and that said Letters Patent is hereby corrected as shown below:

Col. 1, line 30, "DISCLOSURE" should be --SUMMARY--.

Col. 2, line 18, "still" should be --an--;
line 19, delete "another";
line 22, after "in" insert --the--;
line 27, "(2)" should be --1(a)--;
line 29, delete "by 0" (second occurrence);
line 30, after "$(X_0, Y_0)$" insert a comma;
line 34, "1s" should be --$\ell$s--;
line 36, "1s" should be --$\ell$s--;
line 41, "1e" should be --$\ell$e--;
line 42, "1e" should be --$\ell$e--;
line 49, before "G03.1" insert --As noted above--;
line 66, before "end" insert --represents the--.

UNITED STATES PATENT AND TRADEMARK OFFICE
CERTIFICATE OF CORRECTION

PATENT NO. : 4,926,102
DATED : May 15, 1990
INVENTOR(S) : Kawamura et al.

It is certified that error appears in the above-identified patent and that said Letters Patent is hereby corrected as shown below:

Col. 3,    line 18, "ls" should be --$\ell$s--;

line 20, "ls" should be --$\ell$s--;

line 28, "le" should be --$\ell$e--;

line 38, "ls" should be --$\ell$s--;

line 40, "ls" should be --$\ell$s--;

line 61, "equation" should be --equations--.

Col. 4,    line 9, before "of" insert --interpolation--;

line 15, before "G" insert --other--;

line 23, after "interpolation" insert --,--.

Signed and Sealed this

Twenty-first Day of April, 1992

Attest:

HARRY F. MANBECK, JR.

*Attesting Officer*                 *Commissioner of Patents and Trademarks*